United States Patent
Lowe et al.

(10) Patent No.: US 7,171,516 B2
(45) Date of Patent: Jan. 30, 2007

(54) INCREASING THROUGH-PUT OF A STORAGE CONTROLLER BY AUTONOMICALLY ADJUSTING HOST DELAY

(75) Inventors: Steven R. Lowe, Tucson, AZ (US); Kevin J. Ash, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 10/674,871

(22) Filed: Sep. 29, 2003

(65) Prior Publication Data
US 2005/0071550 A1    Mar. 31, 2005

(51) Int. Cl.
*G06F 12/00* (2006.01)
(52) U.S. Cl. ...................................... 711/113
(58) Field of Classification Search ................. 711/113
See application file for complete search history.

(56) References Cited

U.S. PATENT DOCUMENTS

| | | | | |
|---|---|---|---|---|
| 5,544,343 | A | * | 8/1996 | Swenson et al. ............. 711/133 |
| 5,926,834 | A | | 7/1999 | Carlson et al. |
| 6,023,720 | A | * | 2/2000 | Aref et al. ................... 718/103 |
| 6,141,731 | A | * | 10/2000 | Beardsley et al. ........... 711/136 |
| 6,189,080 | B1 | * | 2/2001 | Ofer ........................... 711/167 |
| 6,243,795 | B1 | | 6/2001 | Yang et al. |
| 6,345,338 | B1 | * | 2/2002 | Milillo et al. ................ 711/137 |
| 2002/0152362 | A1 | | 10/2002 | Cochran |
| 2003/0187847 | A1 | * | 10/2003 | Lubbers et al. ................ 707/9 |
| 2004/0255026 | A1 | * | 12/2004 | Blount et al. ................ 709/226 |

OTHER PUBLICATIONS

"Microsoft Computer Dictionary," Fifth Edition, Microsoft Press, 2002, pp. 165.*

* cited by examiner

*Primary Examiner*—Matthew Kim
*Assistant Examiner*—Shane M. Thomas
(74) *Attorney, Agent, or Firm*—Dan Shifrin

(57) ABSTRACT

A data storage control unit is coupled to one or more host devices and to one or more physical storage units, the physical storage units collectives configured as a plurality of logical storage ranks. The storage control unit receives and processes write requests from the host devices and directs that data updates be stored in a temporary storage. The data updates are subsequently destaged to the logical ranks. Write requests are processed at a predetermined rate relative to the rate at which destages are performed (destage mode or rate). The storage control unit evaluates workload conditions of the temporary storage and modifies the destage mode if the temporary storage is in danger of becoming backlogged or if an actual backlog is created, thereby applying a "throttle" to the host write requests. Thus, method, apparatus and program product are provided to dynamically modify a level of throttling whereby through-put of a host device is substantially maintained.

16 Claims, 2 Drawing Sheets

INCREASING THROUGH-PUT OF A STORAGE CONTROLLER BY AUTONOMICALLY ADJUSTING HOST DELAY

TECHNICAL FIELD

The present invention relates generally to data storage systems and, in particular, to dynamically modifying a level of throttling whereby through-put of a host device is substantially maintained.

BACKGROUND ART

High end storage controllers, such as the International Business Machines Corporation (IBM®) Enterprise Storage Server® manage Input/Output (I/O) requests from networked hosts to one or more storage units, such as a direct access storage device (DASD), Redundant Array of Independent Disks (RAID Array), and Just a Bunch of Disks (JBOD). Storage controllers include one or more host bus adaptors or interfaces to communicate with one or more hosts over a network and adaptors or interfaces to communicate with the storage units. The storage controllers also include a cache memory and often further include a non-volatile storage device (NVS) which generally has a substantially smaller storage space than the cache memory) and which may be comprised of a battery backed-up random access memory. In a Fast Write operation, the storage controller receives write requests from the host device and writes data updates to both the cache and NVS. The NVS is used to provide an extra copy of the data update in the event that the copy of the update in cache is lost as a result of a system failure. The storage controller returns a "write complete" message to the host which initiated the update request upon completing the write to both the cache and NVS, but before the data is actually written to the storage unit. The cached data is subsequently destaged to a target storage unit. Once destaged to disk, the update copy in the cache and NVS may be removed. The storage units may be configured as logical devices or "ranks" making the physical devices transparent to the host device. The cache and NVS unit of a storage controller may store updates intended for multiple ranks and each rank may be allocated a percentage of the total capacity of the NVS (see, for example, co-pending and commonly assigned U.S. patent application Ser. No. 2003/0037,204 now U.S. Pat. No. 6,775,738, filed Aug.17, 2001 and entitled Method, System, and Program for Caching Data in a Storage Controller, which application is incorporated herein by reference). If a rank dominating the NVS is processing I/Os at a slow rate, then other processes submitting I/Os to other ranks are delayed such that updates are destaged at the rate of the slower, dominating rank. Moreover, if the NVS is destaging updates at a rate slower than it is able to copy new updates, a backlog is created and new write requests may have to be refused. Thus, because "complete" status is not returned to the requesting host unless the update is copied to both the cache and the NVS, a slowdown by a rank may cause a backlog in the NVS processing write requests, ultimately resulting in a slow-down in the host through-put and possible unfavorable host time-out conditions.

One method developed by IBM for reducing the effects of an NVS (or cache) backlog is, upon detection of a backlog (determined by comparison to a predetermined threshold rate), to reduce the rate at which write requests are transmitted from the host relative to the rate at which data updates are destaged. Such a "throttling" may be to a fixed, slower ratio of write requests per destage. However, other conditions may be present which alleviate the need for throttling but which are not taken into account when the reduced ratio is imposed.

Consequently, a need remains for autonomically or dynamically modifying the destage ratio depending upon workload conditions.

SUMMARY OF THE INVENTION

The present invention provides method, apparatus and program product by which a data storage controller dynamically modifies a level of throttling whereby through-put of host devices is substantially maintained. The storage controller is coupled to one or more host devices and to one or more physical storage units. The physical storage units are collectively configured as a plurality of logical ranks such that the physical storage units are transparent to the host devices. The storage controller includes temporary memory, such as cache and/or non-volatile storage (NVS) of which a predetermined portion is allocated to each rank.

Write requests associated with data updates are received by the storage controller which stores the data update in a portion of the temporary storage. The data updates are subsequently destaged from the portion of the temporary storage to the corresponding rank. In an initial destage mode (0), no correlation exists between the number of destages required to be complete before a new write request is processed. The storage controller evaluates workload conditions of the temporary storage, such as current capacity, and adjusts the destage mode accordingly. For example, if a backlog in the temporary storage is in danger of being created (that is, write requests are being received faster than data updates are being destaged), the destage mode may be modified to 1 (that is, one destage is required to be completed for each new write requests received). If an actual backlog is detected, the destage mode may be modified to 3 (that is, three destages are required before processing a waiting write request). In such a manner, the host devices are caused to reduce the speed at which they send write requests to the storage controller. Moreover, if workload conditions later improve, the destage mode may be modified to a new level, such as 2.

BRIEF DESCRIPTION OF THE DRAWINGS

Referring now to the drawings in which like reference numbers represent corresponding elements throughout.

DETAILED DESCRIPTION OF THE PREFERRED EMBODIMENT

In the following description, reference is made to the accompanying drawings which form a part hereof and which illustrate several implementations. It is understood that other implementations may be utilized and structural and operational changes may be made without departing from the scope of the present limitations.

Figure 1:
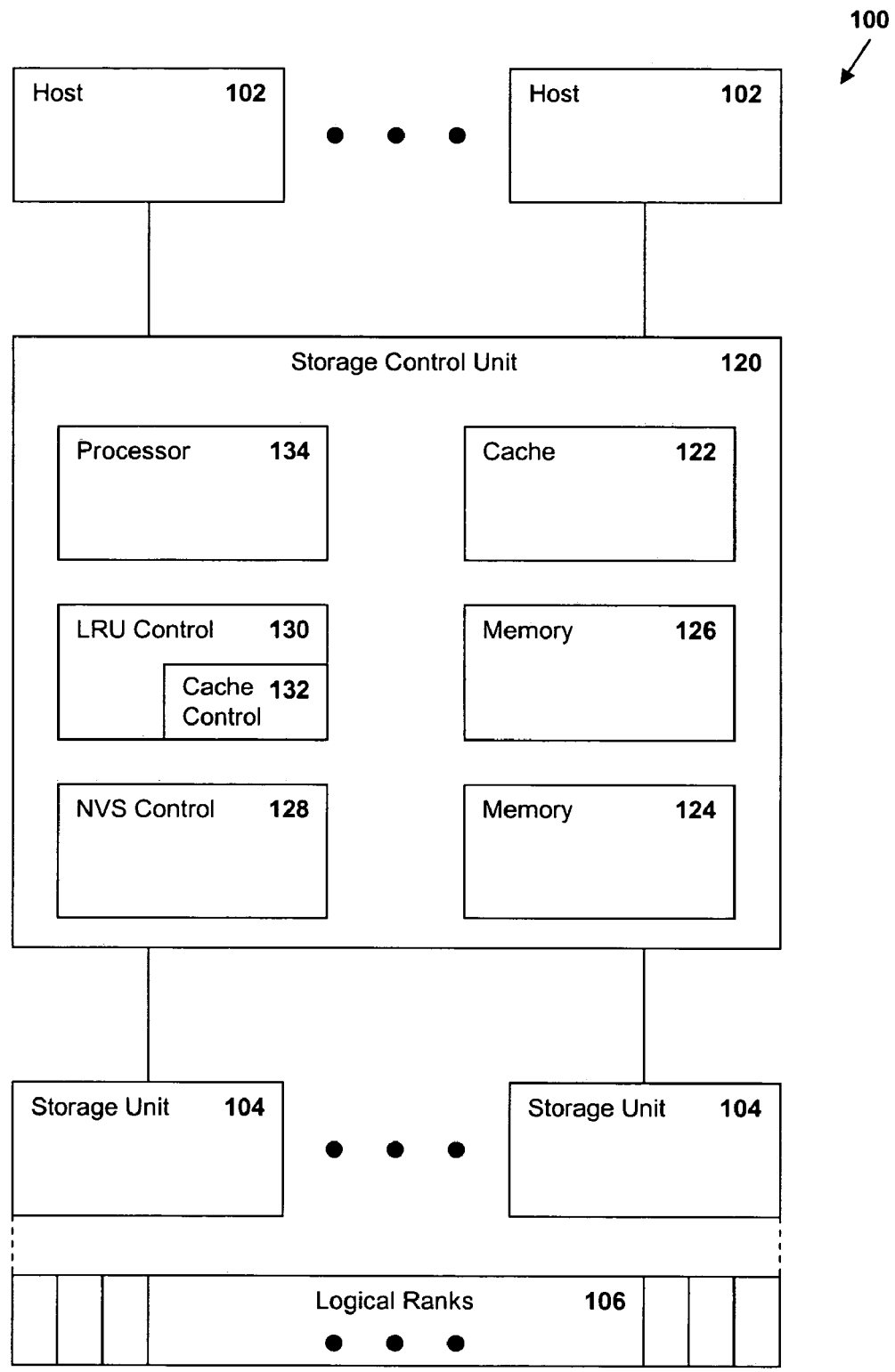
FIG. 1 is a block diagram of a data storage system in which the present invention may be implemented.

FIG. 1 is a block diagram of a data storage system 100 in which the present invention may be implemented. The system 100 includes a storage control unit 120 coupled through appropriate adapters or interfaces to one or more host devices 102 and, also through appropriate adapters or interfaces to one or more physical storage units 104, such as disk storage devices. The physical storage units 104 are preferably collectively configured as a plurality of logical storage ranks 106 whereby the physical devices 104 are transparent to the host devices 102.

The storage control unit (also referred to herein as the "storage controller") 120 includes temporary storage, such as a cache memory 122 and a non-volatile storage memory (NVS) 124, and operating memory 126. The storage controller 120 further includes an NVS controller 128, an LRU controller 130, which includes a cache controller 132, and at least one processor 134. The NVS controller 128 controls the NVS memory 124; the LRU controller 130, with the cache controller 132, controls the cache 126; and the processor 134 supervises all operations of the storage controller 120 by executing instructions stored in the operating memory 126.

Figure 2:
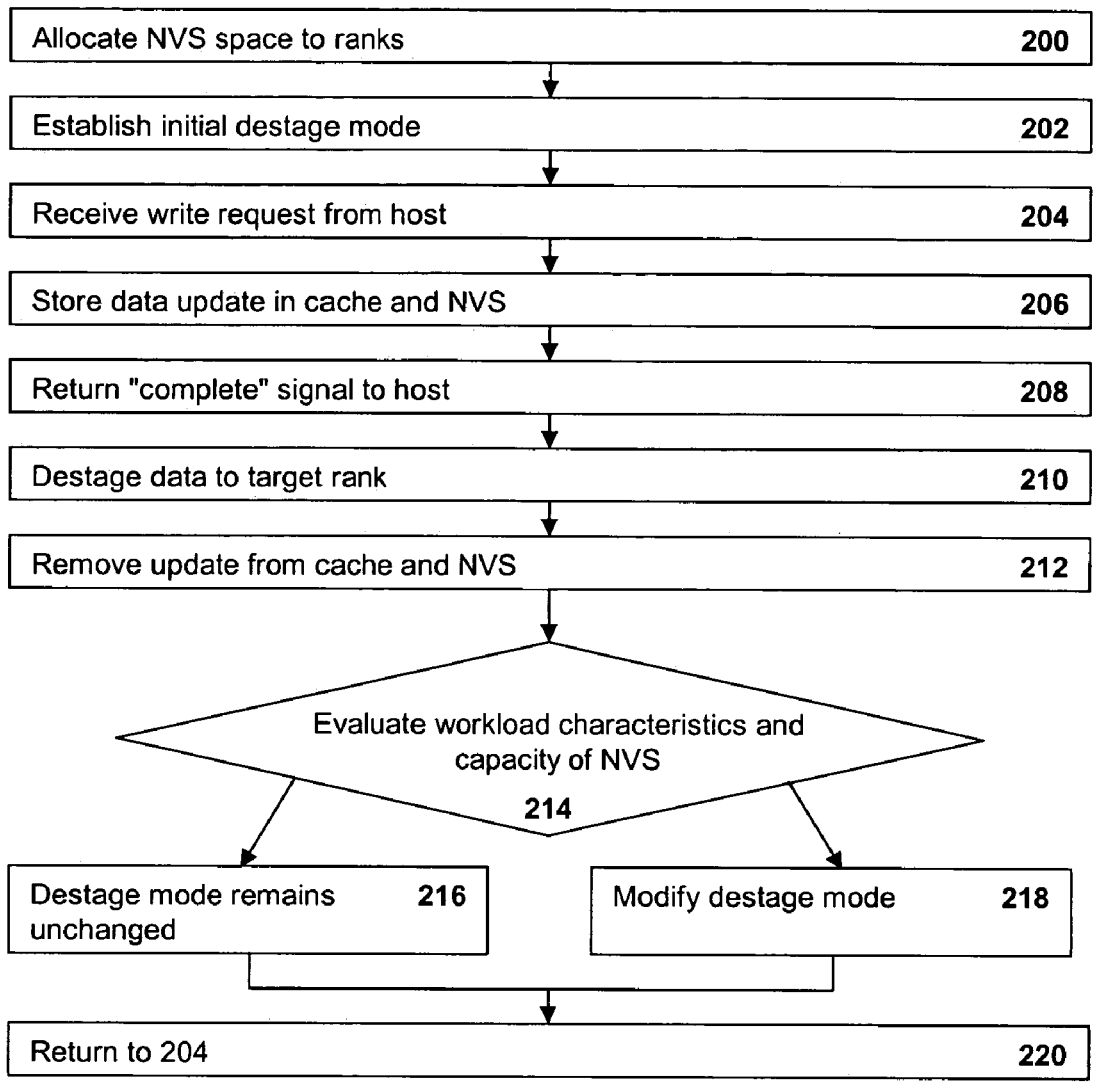
FIG. 2 is a flow chart of an implementation of the present invention.

The operation of an implementation of the storage control unit 120 will be described with reference to the flowchart of FIG. 2. Each logical rank 106 is allocated a portion of the NVS 124 (step 200) whereby each such portion of the NVS 124 is used to temporarily store updates for a specified corresponding rank 106. For example, if there are four ranks 106, each may be allocated 25% of the NVS 124. Additionally, the storage controller 120, such as through the LRU controller 130, establishes an initial destage ratio or mode (step 202) which regulates the number of destage requests processed for each write request processed. When the storage controller 120 receives a write request from the host device 102 (step 204), the data update is stored in both the cache 122 and the portion of the NVS 124 allocated to the target rank 106 (step 206). As previously noted, the storage controller 120 then returns a "write complete" message to the host 102 (step 208) before the data is actually destaged to the target rank 106 (on the physical storage unit(s) 104), enabling the host to return to other activities. When the data is subsequently destaged (step 210), the LRU controller 130 may remove copies from the cache 122 and NVS 124 and reclaim the newly vacant space (step 212).

The LRU controller 130 next evaluates workload characteristics and capacity of the cache 122 and NVS 124 (step 214), including the available capacity in the NVS 124 allocated to each rank 106 and whether a backlog exists or is in danger of being created in the NVS 124 which may reduce the through-put of host write requests. If sufficient NVS space is available for storing expected data updates, the destage mode is left unchanged (step 216). However, if insufficient space is available or other characteristics indicate a real or potential backlog, the destage mode is changed (step 218) by increasing the number of destages required before processing a new write request. For example, when not constrained, the initial destage mode is set to "0" (that is, no correlation between destages required and the processing of new write requests). When a backlog is in danger of being created, the destage mode is set to '1' (that is, one destage is required for each new write request). If an actual backlog exists, then the destage mode is set to "3" (that is, three destages are required before processing a waiting write request), thereby causing the host device 102 to slow the sending of write requests to the NVS 124. During later destage operations, the LRU controller 130 may implement a new appropriate level of throttling, such as by restoring the destage mode to the initial value or by setting a new level, such as "2", according to the then current workload characteristics.

During the operation of the storage controller 120, the cache 122 may be required to perform certain activities, known as long path-length processes, which effectively cause destaging to be temporarily delayed. By monitoring such processes along with other workload characteristics, the LRU controller 130 can modify the destage mode accordingly even though the delay is not the result of a rank slow down.

The described techniques may be implemented as a method, apparatus or computer program product using standard programming and/or engineering techniques to produce software, firmware, hardware, or any combination thereof. The computer program product (such as the operating memory 126), as used herein, refers to code or logic implemented in hardware logic (e.g., an integrated circuit chip, Programmable Gate Array (PGA), Application Specific Integrated Circuit (ASIC), etc.) or a computer readable medium (e.g., magnetic storage medium such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed as instructions by a processor. The code in which implementations are made may further be accessible through a transmission media or from a file server over a network. In such cases, the computer program product in which the code is implemented may comprise a transmission media such as network transmission line, wireless transmission media, signals propagating through space, radio waves, infrared signals, etc. Of course, those skilled in the art will recognize that many modifications may be made to this configuration without departing from the scope of the implementations and that the computer program product may comprise any information bearing medium known in the art.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims. For example, it will be appreciated that functions described herein as being performed by specific elements of the data storage system 100 may be performed by other elements or by a combination of elements.

What is claimed is:

1. A method for increasing through-put of a storage controller by dynamically adjusting host delay, the storage controller coupled to one or more host devices and to one or more disk storage units, the disk storage units collectively comprising a plurality of logical ranks, the method comprising:

allocating a predetermined portion of a temporary storage to each of the plurality of logical ranks;

establishing an initial destage mode whereby data is destaged from a portion of the temporary storage to a corresponding logical rank at a predetermined rate relative to the rate at which host write requests are processed and stored in the temporary storage, the initial destage mode equaling 0 whereby no correlation is present between the number of destages required before a new write request is processed;

destaging a data update from the temporary storage to a target rank;

evaluating workload conditions of the temporary memory to determine whether a backlog is present; and modifying the initial destage mode in response to the evaluation by changing the destage mode to 3 if a backlog is present.

2. The method of claim 1, wherein:
the temporary storage comprises:
  a cache memory; and
  a non-volatile storage memory ("NVS"); and
destaging a data update comprises destaging the data update from the NVS.

3. The method of claim 2, wherein evaluating the workload conditions comprises evaluating the available capacity of the NVS.

4. The method of claim 1 wherein the initial destage mode comprises a destage to write request ratio of 3.

5. The method of claim 4, wherein the modified destage mode comprises a destage to write request ratio of less than 3.

6. The method of claim 1, wherein evaluating the workload conditions comprises determining if the temporary storage is receiving host write requests faster than stored data updates are destaged.

7. The method of claim 1, wherein evaluating the workload conditions comprises evaluating long path-length processes.

8. The method of claim 1, wherein evaluating the workload conditions comprises evaluating whether a backlog is in danger of being created.

9. The method of claim 8, wherein modifying the destage mode comprises changing the destage mode to 1 if a backlog is in danger of being created.

10. The method of claim 1, wherein modifying the destage mode comprises changing the destage mode to 2 if the backlog is reduced.

11. A storage control unit coupled to one or more host devices and to one or more disk storage units, the disk storage units collectively comprising a plurality of logical ranks, the storage control unit comprising:
  a temporary storage having predetermined portions each of which is allocated one of the plurality of logical ranks;
  means for processing write requests received from a host device;
  means for directing that data update associated with each write request be stored in one of the predetermined portions of the temporary storage; and
  means for directing that each data update be destaged from the predetermined portion to a corresponding logical rank at a predetermined destage rate relative to the rate at which write requests are processed and stored in the temporary storage, the initial destage mode equaling 0 whereby no correlation is present between the number of destages required before a new write request is processed;
  means for evaluating workload conditions of the temporary memory comprising means for determining if a backlog is in danger of being created in the temporary storage such that the means for processing write requests is receiving write requests faster than stored data updates are destaged; and
  the means for directing that each data update be destaged directs that each data update be destaged at a modified destaqe rate of 3 if a backlog is present.

12. The storage control unit of claim 11, the temporary storage comprising a non-volatile storage memory ("NVS").

13. The storage control unit of claim 12, wherein the means for evaluating workload conditions comprises means for evaluating the available capacity of the NVS.

14. The storage control unit of claim 12, wherein the means for evaluating workload conditions comprises means for evaluating long path-length processes.

15. The storage control unit of claim 11, wherein the means for directing that each data update be destaged directs that each data update be destaged at a modified destage rate of 1 if a backlog is in danger of being created.

16. The storage control unit of claim 11, wherein the means for directing that each data update be destaged directs that each data update be destaged at a modified destage rate of 2 if the backlog is reduced.

* * * * *